United States Patent
Mast et al.

(10) Patent No.: US 9,808,938 B2
(45) Date of Patent: Nov. 7, 2017

(54) LIFTING TUBE AND HANDLING DEVICE

(71) Applicant: J. Schmalz GmbH, Glatten (DE)

(72) Inventors: Jonas Mast, Baiersbronn (DE); Jonathan Kohler, Schopfloch (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 15/093,293

(22) Filed: Apr. 11, 2016

(65) Prior Publication Data

US 2016/0297079 A1   Oct. 13, 2016

(30) Foreign Application Priority Data

Apr. 9, 2015   (DE) .................. 10 2015 206 322

(51) Int. Cl.
*B65G 47/91* (2006.01)
*B25J 15/06* (2006.01)
*B66C 1/02* (2006.01)

(52) U.S. Cl.
CPC ......... *B25J 15/0616* (2013.01); *B66C 1/0212* (2013.01)

(58) Field of Classification Search
CPC .... B65D 1/0292; B65G 47/91; B65G 47/914; B66F 3/35; F16L 11/00; F16L 11/15; Y10S 215/90; B66C 1/0212; B25J 15/0616
USPC .......... 193/25 C, 25 B, 25 E, 25 R, 25 S, 30; 212/319; 414/626, 627; 294/86.42
See application file for complete search history.

(56) References Cited

U.S. PATENT DOCUMENTS

| | | | | |
|---|---|---|---|---|
| 3,743,340 A | | 7/1973 | Williamann | |
| 4,125,130 A | * | 11/1978 | Yamamoto | F16L 11/00 138/121 |
| 4,413,853 A | * | 11/1983 | Andersson | B66C 1/0212 294/186 |
| 4,802,511 A | * | 2/1989 | Hensley | A22C 13/02 138/118.1 |
| 5,816,635 A | * | 10/1998 | Jansson | F16K 1/16 294/186 |
| 6,367,855 B1 | * | 4/2002 | Schmalz | B25J 15/0616 294/186 |

FOREIGN PATENT DOCUMENTS

DE   2152584   8/1972

OTHER PUBLICATIONS

DE2152584 was also issued as U.S. Pat. No. 3,743,340.

* cited by examiner

*Primary Examiner* — Anna Momper
*Assistant Examiner* — Mark Hageman
(74) *Attorney, Agent, or Firm* — Ware, Fressola, Maguire & Barber LLP

(57) ABSTRACT

The invention concerns a lifting tube as well as a vacuum lifting device with such a lifting tube. The lifting tube has a tube wall extending about a lengthwise axis and enclosing a tube interior, while the lifting tube can be reversibly deformed along its lengthwise axis into an elongated configuration and, with reduction of the tube interior, a contracted configuration. The tube wall has a plurality of outer crease lines, along which the tube wall can buckle to produce the contracted configuration, while the outer crease lines run obliquely to each other so that, when deformed into the contracted configuration, the tube wall experiences a torsion about the lengthwise axis in some sections.

13 Claims, 4 Drawing Sheets

LIFTING TUBE AND HANDLING DEVICE

BACKGROUND OF THE INVENTION

1. Field of Invention

The invention concerns a lifting tube with a tube wall extending about a lengthwise axis and enclosing a tube interior, the lifting tube can be reversibly deformed along its lengthwise axis into an elongated configuration, and with a reduction of the tube interior (28), into a contracted configuration, as well as a handling device, including a tube lifter, with a lifting tube, having a tube interior, wherein the lifting tube can be shortened by applying a partial vacuum to the tube interior, and with a gripping device connected to one end of the lifting tube.

2. Description of Related Art

Lifting tubes of this kind find use, e.g., in tube lifters. A shortening of the lifting tube produced by a partial vacuum supports the lifting of a grasped object. However, other applications are also conceivable for the lifting tubes, such as the role of pneumatic actuators. Here, the lengthening of the lifting tube caused by excess pressure can exert a force on an object, e.g., for the lifting or moving of loads.

Tube lifters with lifting tubes of the mentioned kind are described, e.g., in WO 2005/110907 A1 or in U.S. Pat. No. 4,413,853. These lifting tubes have a bellows-like configuration with encircling annular creases fashioned alternately as inner creases and outer creases along the axial dimension, or a configuration with a helical crease line encircling in screw fashion the longitudinal axis of the lifting tube. Customarily, a wire skeleton is inserted in the outer creases of the lifting tube, which prevents a radial contraction of the lifting tube. The contraction ratio of such lifting tubes, i.e., the ratio of the axial length in the contracted configuration to the length in the elongated configuration cannot easily be reduced below 25% to 30%, since the material layers lying one on another as a result of the folding of the tube wall along the longitudinal axis and the wire skeleton possibly present in the outer creases require a certain space. Therefore, when using such lifting tubes in a tube lifter a not insignificant total height of the device is needed for a desired lift height.

SUMMARY OF THE INVENTION

The problem to be solved by the present invention is to improve the contraction ratio and make it possible to produce the lifting tube as robust, low-wear, and cost-efficient as possible.

This problem is solved by the lifting tube, which has a tube wall extending about a lengthwise axis and enclosing an axially extended tube interior, while the lifting tube can be reversibly deformed along its lengthwise axis into an elongated configuration (large volume of the tube interior) and a contracted configuration (small volume of the tube interior).

By subjecting the tube interior to a lower pressure than the surroundings, a deformation into the contracted configuration can be brought about (e.g., use as a lifting tube in a vacuum lifting device). On the other hand, e.g., by subjecting the tube interior to an excess pressure as compared to the surroundings, a deformation into the elongated configuration can be brought about, in order to exert a force on an object, for example (use as a pneumatic actuator).

The tube wall has a plurality of outer crease lines, along which the tube wall can buckle or fold to produce the contracted configuration. The outer crease lines run obliquely to each other at or in the tube wall so that, when deformed from the elongated configuration to the contracted configuration, segments of the tube wall experience a torsion about the lengthwise axis.

The folding along the outer crease lines slanting toward each other, and the associated torsion of the tube wall, means that the regions of tube wall which are folded inward, starting from the outer crease lines, are not only folded into the tube interior along the lengthwise axis but also twisted in. This can accomplish a higher contraction ratio. Furthermore, depending on the configuration, there is also less material strain than in the case of compression of the tube wall by simple folding along the lengthwise axis.

The combination of several bending lines slanting toward each other furthermore produces a substantial stability to radial compression. This prevents an unwanted radial denting of the tube wall. Moreover, the material stiffness in combination with the slanting fold directions can be utilized to achieve a restoring force against a deformation of the lifting tube into the contracted configuration, which can be desirable when used as a lifting tube. On the other hand, depending on the configuration, a restoring force against a deformation into the elongated configuration can be achieved.

The material of the tube wall extends each time from the outer crease lines toward the tube interior or the lengthwise axis, especially such that an outer crease is formed in the contracted configuration. Since several outer crease lines run slanting to each other, a high stability can be achieved. If need be, one can dispense with a reinforcement by wire skeletons running in the outer creases, although such reinforcing skeletons are basically possible as optional configurations.

In order to achieve the torsion, the outer crease lines comprise a plurality of annular crease lines encircling the lengthwise axis in closed manner as well as a number n of oblique crease lines intersecting the annular crease lines, wherein the oblique crease lines run at a slant to the annular crease lines so that the torsion is achieved upon folding the tube wall along the oblique crease lines and/or the annular crease lines. In particular, all of the outer crease lines of the tube wall are either such annular crease lines or such oblique crease lines. Preferably, the encircling annular crease lines are arranged in succession along the lengthwise axis. Thus, annular segments of the tube wall are defined between the consecutive annular crease lines, while the tube wall in the respective annular segment can be folded along the oblique crease lines to produce the contracted configuration. When the tube wall is folded along the slanting oblique crease lines, the regions of the tube wall situated above the annular segment and then twisted relative to the regions situated below the annular segment.

It is especially advantageous when all the annular crease lines run perpendicular to the lengthwise axis. This achieves a high stability of the lifting tube to shear movements.

Material stresses upon folding or upon torsion can be avoided in that, at least in the elongated configuration, all of the oblique crease lines run parallel to each other. Accordingly, the oblique crease lines run about the lengthwise axis in particular in a helix on the tube wall.

It is also advantageous for all oblique crease lines which intersect a particular annular crease line to make a congruent acute angle with that annular crease line, the so-called angle of rise. In this way, all oblique crease lines can be folded at the same time and free of stress toward the respective annular crease line, which produces the desired torsion. The larger the angle of rise, the larger also the torsion angle by which the tube wall is twisted about the lengthwise axis upon folding of the oblique crease lines onto the annular crease lines.

According to one advantageous embodiment, the sum of the angle of rise—considered for each annular crease line—at the intersecting points on this annular crease line totals 360°. When this angle sum is observed, an especially stress-free folding is possible.

In the present context, the annular crease lines in particular are not to be understood as circular round lines. Instead, corners are formed at the intersecting points of the annular crease lines with the oblique crease lines. Accordingly, the lifting tube differs from the known bellows shapes or helical shapes. Preferably, the annular crease lines when viewed along the lengthwise axis have the shape of a regular polygon, especially an equilateral polygon, with a number n of corners. The corners of the polygon coincide in particular with the intersecting points of the respective annular crease line with the oblique crease lines. The form of a regular polygon produces a symmetry (at least in the sense of an n-fold axis) about the lengthwise axis of the lifting tube. In this way, one can prevent asymmetrical behavior of the lifting tube under laterally acting shear forces.

It is especially advantageous for the angle of rise to amount to the n-th fraction of 360°, where n is the number of corners on a particular annular crease line. This produces a high degree of symmetry, which means small local stresses upon contraction and thus low material wear. It has proven to be especially advantageous to have, for example, a hexagonal run of the annular crease lines with an assigned angle of rise of 60°.

Moreover, it is advantageous for the intersecting annular crease line and the associated oblique crease line at each intersecting point to form intersecting equal-length legs subtending an acute angle (the aforementioned angle of rise). Accordingly, the length of the leg from the particular intersecting point to the respective neighboring intersecting point along the respective bending line is of equal length for the two intersecting bending lines. In this way, it is possible between every two consecutive annular crease lines along the lengthwise axis to fold the oblique crease lines down entirely on the intersecting annular crease lines. This provides a high contraction ratio.

According to one advantageous configuration, the annular crease lines are arranged along the lengthwise axis at a regular spacing, the so-called layer height. The layer height represents the spacing of two neighboring annular crease lines along the lengthwise axis. Thus, a direct relation exists between the layer height, the angle of rise and the length of the legs intersecting at an intersecting point (see above) and also optionally the number of corners of the respective annular crease line. Upon contraction, the region between two annular crease lines is folded under torsion, while the extension of the lifting tube along the lengthwise axis can be reduced from the layer height to approximately the entire thickness of the material layers lying one on top of the other between two annular crease lines.

The tube wall in addition to the outer crease lines preferably comprises a plurality of inner crease lines, from which in the contracted configuration the tube wall extends outwardly (that is, away from the lengthwise axis) to the outer crease lines. Each of the inner crease lines preferably runs through intersecting points of two neighboring annular crease lines along the lengthwise axis, while the intersecting points are each coordinated with different oblique lines. The material of the tube wall situated between the neighboring annular crease lines forms an inner fold on the inner crease line, which projects into the tube interior and is twisted into the interior space upon contraction.

The inner crease line preferably runs such that, especially when the elongated configuration is present, the inner crease line forms a bisector of the angle intersecting at an intersecting point, whose legs are formed by the annular crease line and oblique crease line coordinated with the particular intersecting point. Since the inner crease line is the angle bisector of the two intersecting outer crease lines, the outer crease lines can be folded onto each other. In particular, the inner crease lines form diagonals of parallelograms, which are defined by annular crease lines and the bending lines of rise and whose corners form the respective intersecting points.

One advantageous configuration results in that the tube wall has a plurality of reinforcement zones, which are bounded by edges which run along the intersecting inner crease lines, annular crease lines and oblique crease lines. The reinforcement zones are areas of the tube wall in which the tube wall is less flexible than in the area of the outer crease lines or inner crease lines. The reinforcement zones can be formed, for example, by reinforcement plates which are bounded along said edges. The reinforcement plates are arranged, e.g., on the tube wall, e.g., on an inner side or an outer side. The reinforcement zones preferably have polygonal, especially triangular shape, where one side is defined by an inner crease line, one side by an annular crease line and one side by an oblique crease line.

The inner crease lines dictate how the material of the tube wall is folded into the tube interior upon contraction. Thus, the inner crease lines, when viewed in a projection along the lengthwise axis, bound a cross sectional area of the tube. Thanks to the torsion, as the tube wall contracts the inner crease lines are twisted inward toward the lengthwise axis. In this way, the cross sectional area of the tube is continually reduce during the transition of the lifting tube from the elongated configuration to the contracted configuration.

The tube wall of the lifting tube consists in particular of a flexible and non-extensible material (i.e., one which cannot stretch to a significant degree), such as a film of a suitable plastic or an airtight fiber cloth. In this way, the lifting tube is reversibly bendable and foldable, but not significantly stretchable, where these criteria pertain in particular to the forces typically occurring in the application case of a tube lifter.

The problem mentioned at the outset is also solved advantageously by a handling device, especially a vacuum lifting device such as a tube lifter, which has a lifting tube of the above described kind and a gripping device connected to one free end of the lifting tube.

BRIEF DESCRIPTION OF THE DRAWING

The drawing includes FIGS. 1-5, as follows.

In the figures and in the following description each time the same reference numbers are used for identical or corresponding features.

DETAILED DESCRIPTION OF THE BEST MODE OF THE INVENTION

Figure 1:
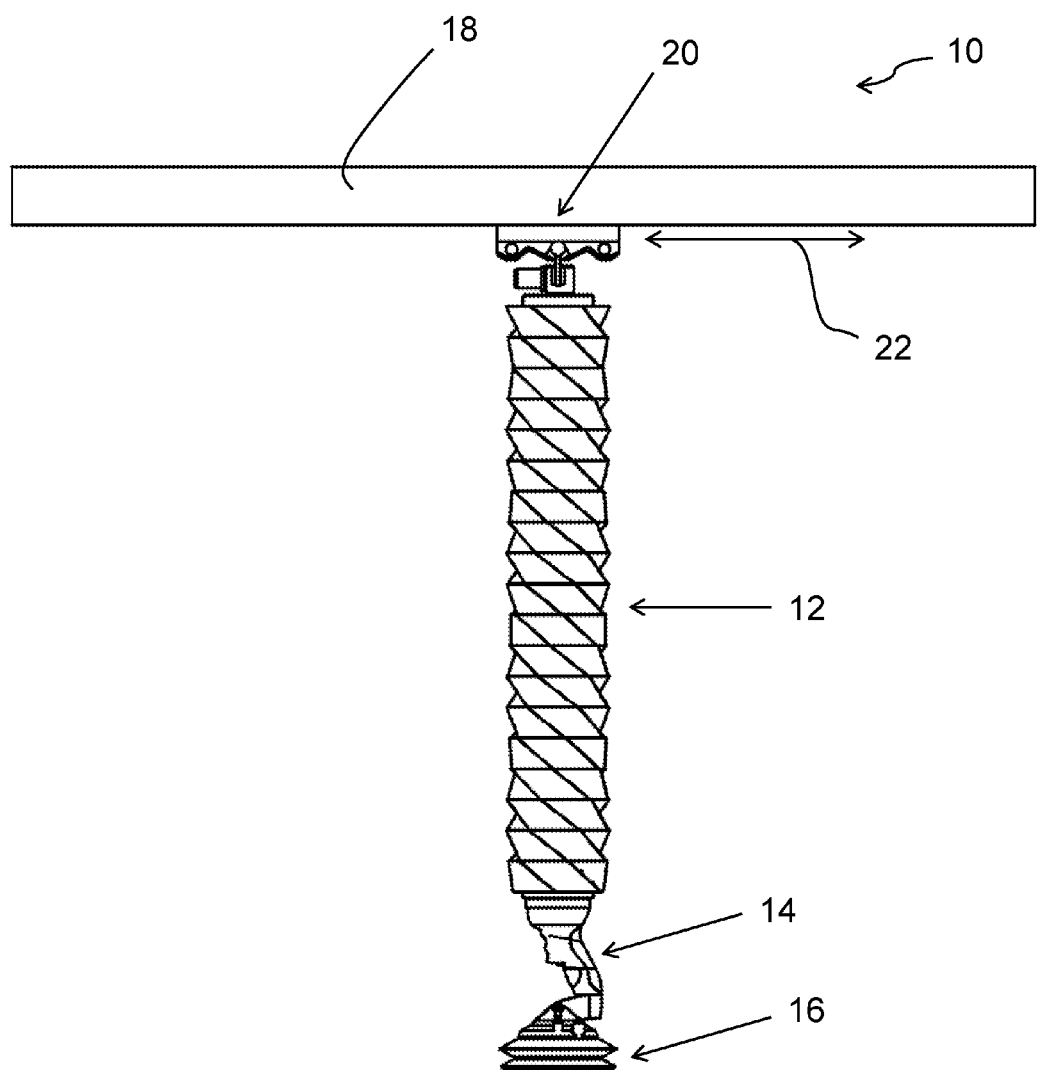
FIG. 1 shows a tube lifter according to the invention with a lifting tube according to the invention.

FIG. 1 shows a sketch of a tube lifter 10 with a lifting tube 12 described more closely below, wherein one end of the lifting tube 12 is coupled via an operator device 14 to a vacuum gripping device 16. By its end opposite the vacuum gripping device 16 the lifting tube 12 is connected to a beam 18, especially in such a way that a hanging position 20 of the lifting tube 12 can be shifted along a lateral direction 22.

With the vacuum gripping device 16, an object (not shown) can be grasped by suction. With suitable operation by the operator device 14, the lifting tube 12 can then be shortened by applying partial vacuum to its tube interior (see below), thereby lifting the grasped object.

FIGS. 2 to 5 each show a segment of the lifting tube 12 in different views and in different configurations.

The lifting tube 12 has a tube wall 24 made of a flexible yet preferably not significantly elastic material. The tube wall 24 as a whole encloses a tube interior 28 extending axially along a lengthwise axis 26 (being especially recognizable in the views according to FIGS. 4 and 5).

Figure 2:
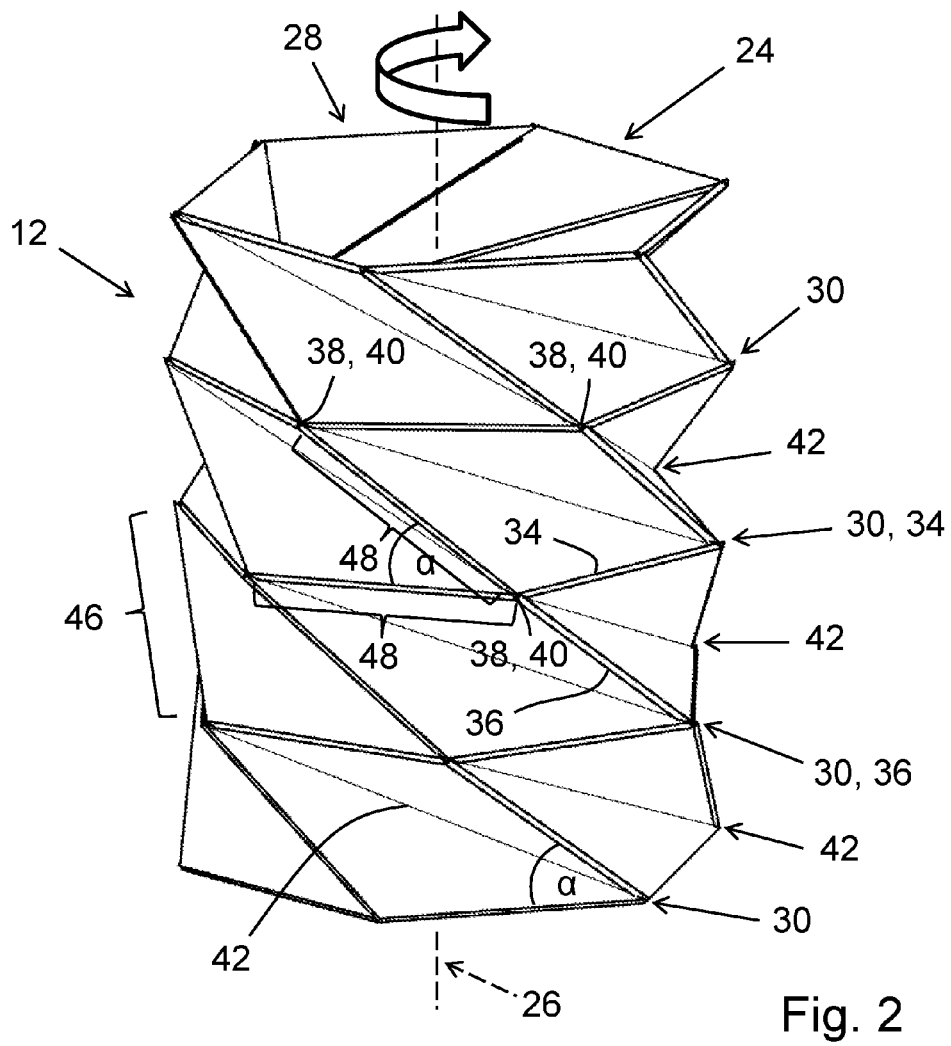
FIG. 2 shows a lifting tube according to the invention in side view for an essentially elongated configuration.
Figure 3:
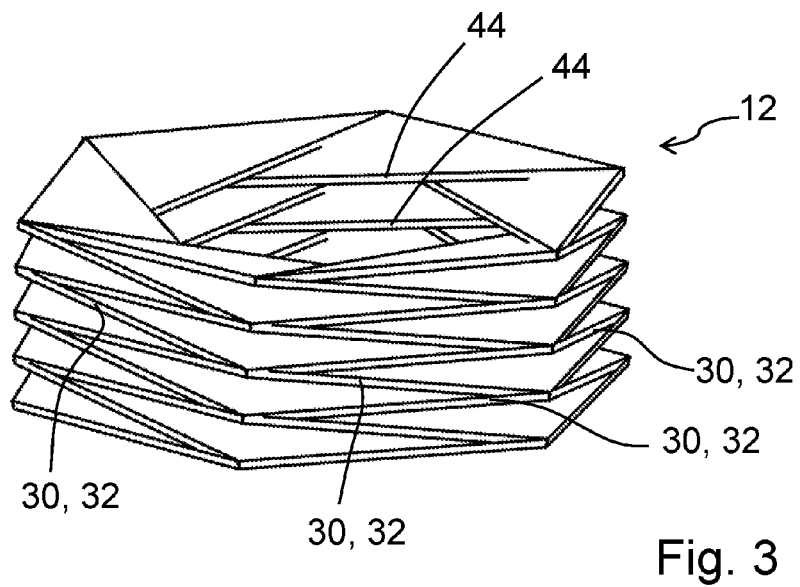
FIG. 3 shows the lifting tube of FIG. 2 in a contracted configuration.
Figure 4:
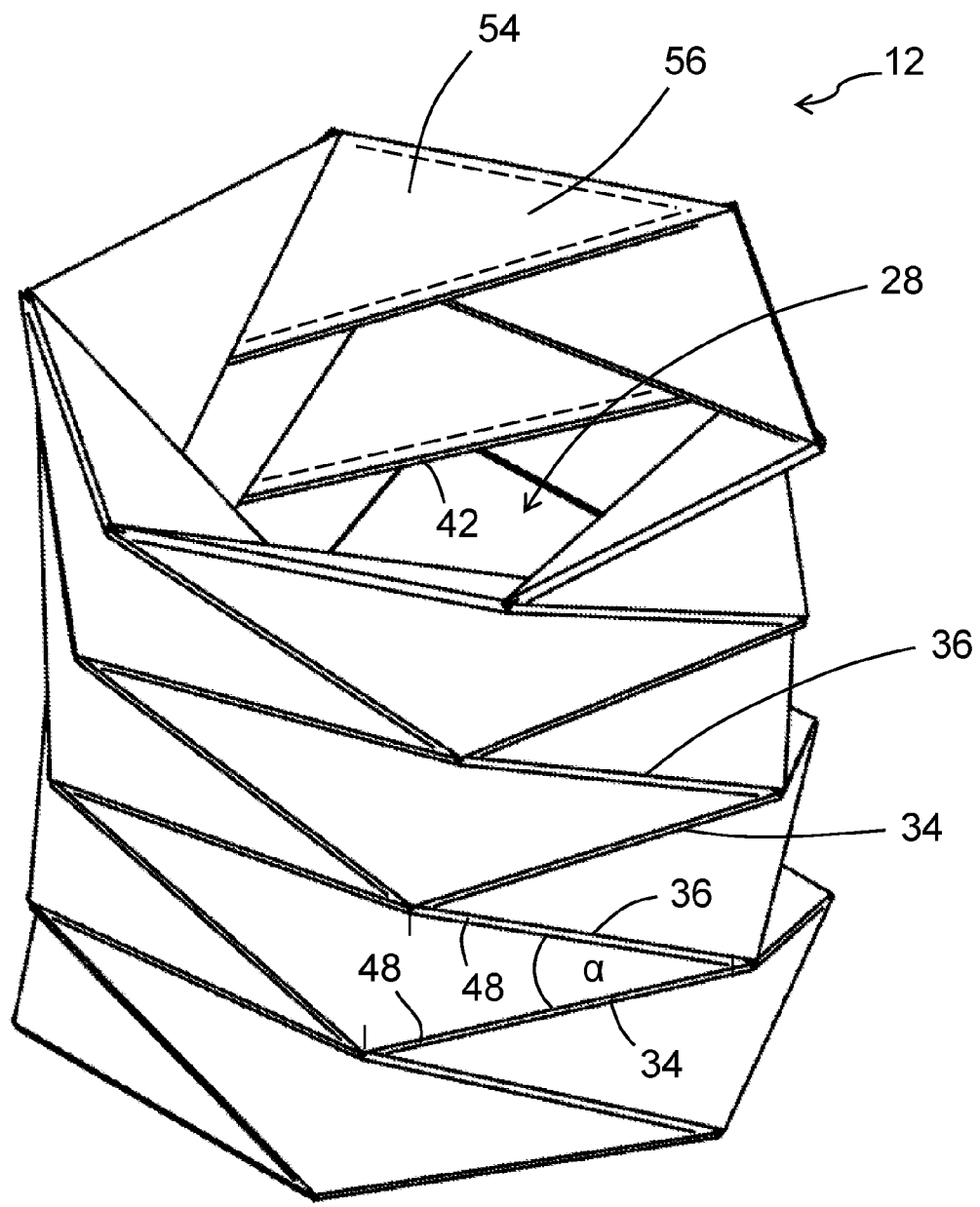
FIG. 4 shows the lifting tube of FIGS. 2 and 3 in a perspective view.

The lifting tube 12 as a whole can be deformed continuously into an elongated configuration (similar to FIG. 2) and a contracted configuration (similar to FIG. 3). FIG. 2 shows essentially the elongated configuration, where a further stretching is still possible to a slight extent. Accordingly, starting from FIG. 3, a further contraction is still possible.

In order to make the deformation possible, the tube wall 24 has a plurality of outer crease lines 30. The material of the tube wall 24 has in particular a certain stiffness, so that the outer crease lines 30 are permanently defined. Starting from the outer crease lines 30, the material of the tube wall 24 extends inward when the contracted configuration is present (see FIG. 3), so that outer creases 32 are pronounced.

In the example shown, all the outer crease lines can be divided into two groups, namely, annular crease lines 34 and oblique crease lines 36. The annular crease lines 34 run around the lengthwise axis 26 as a closed shape, in the example shown, as a polygon (here: a hexagon). The oblique crease lines viewed as a whole run in a helix about the lengthwise axis 26. Thus, the oblique crease lines intersect the annular crease lines in a plurality of intersecting points 38. The intersecting points 38 form the corners 40 of the polygonal annular crease lines 34.

The tube wall 24 furthermore has a plurality of inner crease lines 42, along which the tube wall 24 has the least distance from the lengthwise axis 26 each time. The inner crease lines 42 define in the contracted configuration (see FIG. 3) inner creases 44 of the tube wall 24. The inner crease lines 42 extend each time between intersecting points 40 along the lengthwise axis 26 of neighboring annular crease lines 34, such that neighboring oblique crease lines 36 are connected.

When the tube wall 24 is folded, the oblique crease lines 36 are folded each time onto the intersecting annular crease lines 30. The material of the tube wall is folded into the tube interior 28, forming the inner creases 44. Since the oblique crease lines run at a slant to the annular crease lines 34, different segments of the tube wall 24 experience a torsion when deformed into the contracted configuration (see FIG. 3), that is, a twisting about the lengthwise axis 26. The inner creases 44 and the inner crease lines 42 are twisted into the tube interior 28 toward the lengthwise axis 26 (see FIG. 4). This effect is strengthened in the example shown by the fact that all the oblique crease lines 36 run essentially parallel to each other.

Figure 5:
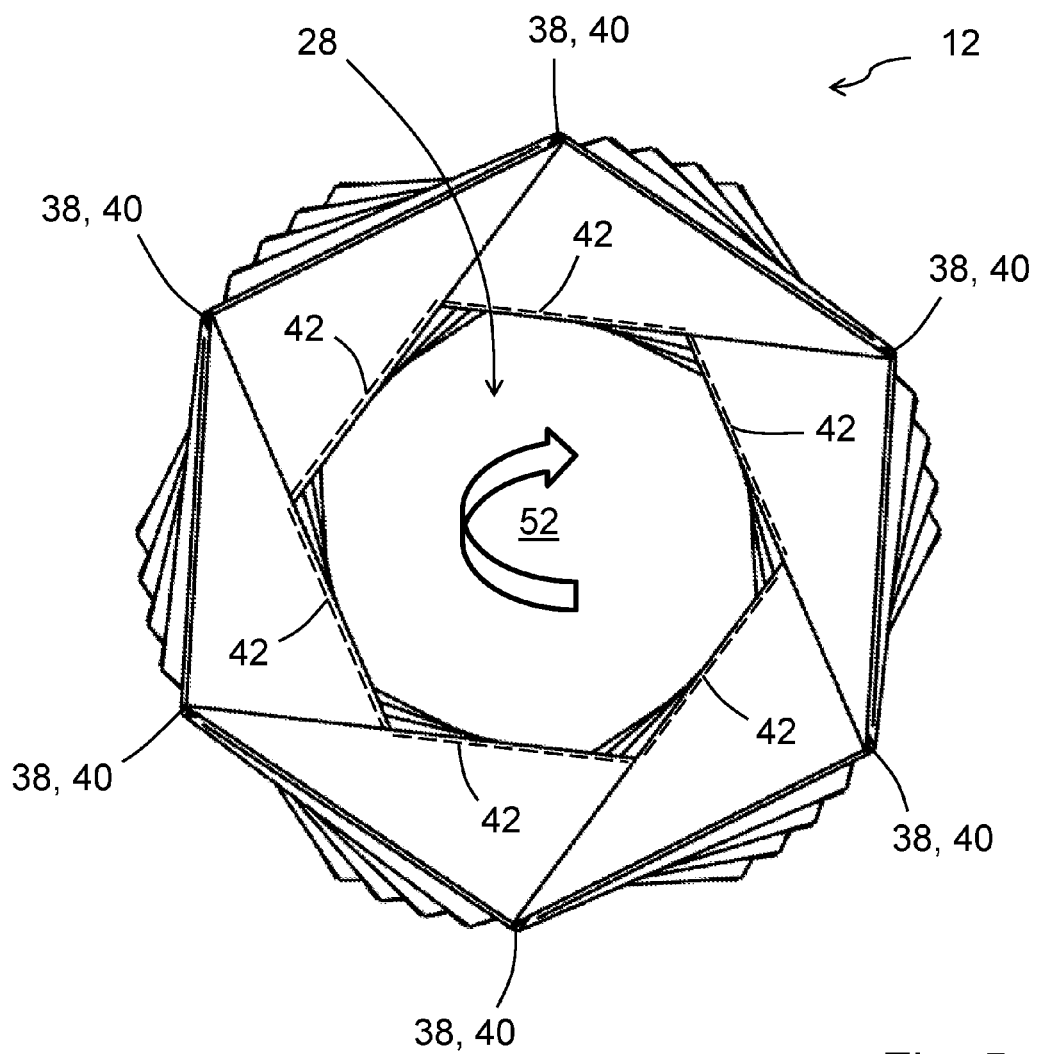
FIG. 5 shows the lifting tube of FIGS. 2 to 4 in a view along the lengthwise axis.

The torsion upon contraction occurs about the lengthwise axis 26 and is indicated in FIGS. 2 and 5 by a circular arrow. The torsion can be understood in particular as a twisting about the lengthwise axis 26 of segments of the tube wall 24 relative to other segments of the tube wall 24 at a distance along the lengthwise axis 26. The direction of rotation of the torsion corresponds in particular to the acute aperture angle enclosed between the oblique crease lines 36 and the annular crease lines 34 (angle of rise, see below).

Between parallel running and neighboring annular crease lines 34 along the lengthwise axis 26, it is possible to define a layer height 46 as a distance along the lengthwise axis 26 (see FIG. 2) when the elongated configuration is present (in the manner of FIG. 2). The layer height 46 is reduced upon conversion to the contracted configuration essentially to the thickness of the inner creases 44 and outer creases 32 situated between the annular crease lines 34.

Considering a particular annular crease line 34 in the example shown, the various oblique crease lines 36 intersect this annular crease line 34 at the intersecting points 40 each time at an angle of rise α. In the example shown, the angle of rise α is the acute angle enclosed between the oblique crease lines 36 and the annular crease line 34, which in particular is opened for all intersecting points 40 in the same direction of revolution about the lengthwise axis 26. The angle of rise α is related to the torsion upon producing the contracted position, since the oblique crease lines 36 are folded by the angle α toward the annular crease lines 34.

In the symmetrical configuration shown, the segments of the annular crease lines 34 or the oblique crease lines 36, extending between different intersecting points 40 and enclosing a particular bending angle of rise α, each time have legs 48 of equal length. The leg 48 of the oblique crease line 36, defining the angle of rise α, can thereby be folded entirely on the segment of the annular crease line 34 forming the other leg 48.

The inner crease lines 42 extending between different intersecting points 38 preferably form a bisector of the angle of rise α enclosed by the legs 48. In this case, the inner crease lines 42 can form in particular diagonals 50 of the parallelograms recognizable for example in FIG. 2, which are defined by segments between intersecting points 38 of two consecutive annular crease lines 34 along the lengthwise axis and two adjacent and parallel oblique crease lines 36.

As can be recognized in FIG. 5, when the contracted configuration is produced, the inner crease lines 42 folded in the tube interior 28 bound a cross sectional area 52 of the tube, looking along the lengthwise axis 26. Since, upon contraction of the lifting tube 12, the inner crease lines 42 are twisted and folded increasingly further into the tube interior 28, the cross sectional area 52 of the tube increasingly narrows with increasing contraction. In the example shown, the cross sectional area 52 of the tube has the same symmetry as the outer contour of the tube wall defined by the annular crease lines 34 (here: hexagonal symmetry).

In order to further improve the stability of the tube wall 24 against radial compression toward the lengthwise axis 26, the fold segments 54 defined between the inner crease lines 42 and the outer crease lines 30 (see FIG. 4) can be configured as reinforcement zones 56, in which the tube wall 24 is more stable and has less flexibility in particular. For this, e.g., the reinforcement zones 56 can be stiffened with resins or plastic fractions in the fabric of the tube wall 24.

The regions of the inner crease lines 42 and/or outer crease lines 30 can be provided, for example, with flexible or softening materials (such as silicones). Appropriately shaped reinforcement plates can also be provided on the tube wall 24 to form the reinforcement zones 56. Such reinforcement plates according to one general aspect of the invention can be arranged, for example, on the tube wall 24, such as the surface facing the tube interior 28 (by gluing, for example). Naturally, reinforcement plates can also be arranged on the outer surface.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

The invention claimed is:

1. Lifting tube (12) with a tube wall (24) extending about a lengthwise axis (26) and enclosing a tube interior (28), the lifting tube (12) can be reversibly deformed along its lengthwise axis (26) into an elongated configuration, and with a reduction of the tube interior (28), into a contracted configuration, characterized in that
the tube wall (24) has a plurality of outer crease lines (30), along which the tube wall (24) can buckle to produce the contracted configuration, the outer crease lines (30) run obliquely to each other so that, when deformed into the contracted configuration, the tube wall (24) experiences a torsion about the lengthwise axis (26) in some sections, the outer crease lines (30) comprise a plurality of annular crease lines (34) encircling the lengthwise axis (28) in a closed manner as well as a number (n) of oblique crease lines (36) intersecting the annular crease lines (34) at intersecting points (38), wherein the annular crease lines (34) run perpendicular to the lengthwise axis (26),
wherein the oblique crease lines (36) run at a slant to the annular crease lines (34) so that the torsion is achieved upon folding the tube wall (24),
wherein in the elongated configuration, all oblique crease lines (36) which intersect a particular annular crease line (34) make a congruent acute angle of rise (α) with the annular crease line (34) at the intersecting point, and
wherein in the elongated configuration, the sum of the angle of rise (α) for each annular crease line (34) at the intersecting points (38) on this annular crease line (34) totals 360°, and wherein the tube wall comprises an airtight material such that a change in air pressure within the tube interior can be used to transition the lifting tube between the elongated and contracted configurations.

2. Lifting tube (12) according to claim 1, characterized in that all oblique crease lines (36) run parallel to each other in the elongated configuration.

3. Lifting tube (12) according to claim 1, characterized in that each of the annular crease lines (34), when viewed along the lengthwise axis (26), has the shape of a regular polygon with a number n of corners (40).

4. Lifting tube (12) according to claim 3, characterized in that in the elongated configuration, the angle of rise (α) amounts to the n-th fraction of 360 degrees, where n is the number of corners (40) of a particular annular crease line (34).

5. Lifting tube (12) according to claim 1, characterized in that in the elongated configuration, the angle of rise (α) amounts to the n-th fraction of 360 degrees, where n is the number of corners (40) of a particular annular crease line (34).

6. Lifting tube (12) according to claim 1, characterized in that the annular crease lines (34) and the oblique crease lines (36) intersecting at each intersecting point (38) form equal-length legs (48) subtending an acute angle of rise (α), when the lifting tube (12) is in the elongated configuration.

7. Lifting tube (12) according to claim 1, characterized in that in the elongated configuration the annular crease lines (34) are arranged along the lengthwise axis (26) spaced apart from each other equidistant with a layer height (46).

8. Lifting tube (12) according to claim 1, characterized in that the tube wall (24) comprises a plurality of inner crease lines (42), each inner crease line (42) running through intersecting points (38) of two neighboring annular crease lines (34) along the lengthwise axis (26) with different oblique crease lines (36).

9. Lifting tube (12) according to claim 8, characterized in that each inner crease line (42) forms a bisector of the angle of the intersecting annular crease line (34) and oblique crease line (36), through whose intersecting point (38) the respective inner crease line (42) also runs.

10. Lifting tube (12) according to claim 8, characterized in that the tube wall (24) is provided with reinforcement zones (56), which are bounded by edges which run along the intersecting inner crease lines (42), annular crease lines (34) and oblique crease lines (36).

11. Lifting tube (12) according to claim 8, characterized in that the inner crease lines (42), when viewed in a projection along the lengthwise axis (26), bound a cross sectional area of the tube (52), which is continually reduced as the lifting tube (12) is converted from the elongated configuration to the contracted configuration.

12. Lifting tube (12) according to claim 1, characterized in that all oblique crease lines (36) run parallel to each other in the elongated configuration.

13. Handling device (10), including a tube lifter, with a lifting tube (12), having a tube interior (28), wherein the lifting tube (12) can be shortened by applying a partial vacuum to the tube interior (28), and with a gripping device (16) connected to one end of the lifting tube (12), characterized in that the lifting tube (12) is configured according to claim 1.

* * * * *